United States Patent
Nimberger

(10) Patent No.: US 6,938,636 B1
(45) Date of Patent: Sep. 6, 2005

(54) BREAKAWAY COUPLING WITH FLAPPER VALVE

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 0 days.

(21) Appl. No.: 10/941,358

(22) Filed: Sep. 15, 2004

Related U.S. Application Data

(62) Division of application No. 10/799,816, filed on Mar. 12, 2004, now Pat. No. 6,840,277.

(51) Int. Cl.[7] .......................... F16L 29/00; F16L 37/28

(52) U.S. Cl. .............................. 137/15.09; 137/614.05; 137/614; 285/39; 285/316; 251/149.2

(58) Field of Search .................. 137/614.05, 614.04, 137/614.03, 614, 15.01, 15.08, 15.09, 68.14, 137/315.01; 285/39, 314, 316, 305, 308, 285/1, 317; 251/149.2

(56) References Cited

U.S. PATENT DOCUMENTS

| | | | |
|---|---|---|---|
| 3,909,046 A | * | 9/1975 | Legris .......................... 285/39 |
| 4,090,524 A | | 5/1978 | Allread et al. |
| 4,240,651 A | * | 12/1980 | Mariaulle ..................... 285/39 |
| 5,228,474 A | | 7/1993 | Nimberger |
| 5,320,133 A | | 6/1994 | Nimberger |
| 5,419,354 A | | 5/1995 | Krynicki |
| 5,699,822 A | | 12/1997 | Bodhaine |
| 5,947,142 A | | 9/1999 | Nimberger et al. |
| 6,840,277 B1 | * | 1/2005 | Nimberger ............. 137/614.05 |

* cited by examiner

Primary Examiner—Kevin Lee
(74) Attorney, Agent, or Firm—Browning Bushman P.C.

(57) ABSTRACT

A breakaway coupler for coupling upstream and downstream hose includes one or more locking balls carried by a downstream coupling member. An upstream flapper is pivotally secured with respect to an upstream housing. A pushrod is axially movable in response to engagement by the downstream coupling member. A pry recess on the downstream coupling member is spaced between the downstream housing and the upstream housing, such that a tool inserted into the pry recess is leverageable to move the downstream coupling member to unlock the breakaway coupler.

20 Claims, 9 Drawing Sheets

BREAKAWAY COUPLING WITH FLAPPER VALVE

CROSS-REFERENCE TO RELATED APPLICATIONS

This application is a divisional of U.S. patent application Ser. No. 10/799,816 filed Mar. 12, 2004 U.S. Pat. No. 6,840,277.

FIELD OF THE INVENTION

The invention relates to a breakaway coupling with improved reliability and reduced service costs. More particularly, this invention relates to a breakaway coupling particularly suitable for positioning between a liquid anhydrous-ammonia nurse tank and an applicator for applying the liquid anhydrous ammonia to the field. Upon separation, each coupling half is automatically sealed for retaining the liquid anhydrous ammonia in the flow lines extending to and from the coupling.

BACKGROUND OF THE INVENTION

Flow line systems which transport potentially dangerous fluids, such as anhydrous ammonia, commonly include a separable connection for emergency interruption of the flow line which extends between a stationary vessel and a potentially portable vessel, such as a transport vehicle. Occasionally, the driver of the transport vehicle inadvertently pulls away from the stationary vessel prior to disconnecting the flexible flow line, and the absence of a separable connection may otherwise cause a rupture of the fill line. The monetary loss of fluid from such a rupture is nominal compared to the danger of releasing toxic vapors. The release of anhydrous ammonia may seriously injure the operator, causing blindness, skin burns, or loss of smell. For other potentially dangerous fluids, such as propane and liquid petroleum gas, the release of the fluid may cause adverse environmental consequences to the filling station site or create a fire hazard. One type of improved breakaway connection, marketed as TRIPOD (TM) coupling, is disclosed in U.S. Pat. Nos. 5,228,474 and 5,320,133. The TRIPOD coupling is particularly suitable for positioning between a stationary filling platform and a transport vehicle.

In a typical anhydrous ammonia application system, a nurse tank, which may be periodically filled by the above-described transport vehicle, is attached to anhydrous ammonia applicator with a mechanical hitch. Each end of the hose which connects the nurse tank and an applicator includes a shutoff valve. A breakaway coupling is provided between the shutoff valves, and is designed so that it will uncouple with a pull force sufficiently small to not damage the nurse tank. The primary purpose of the breakaway coupling is both to separate or breakaway and to shut off the flow of ammonia in the event of separation of the applicator and nurse tank at the mechanical hitch.

The PIONEER (TM) breakaway coupling, used in anhydrous ammonia application systems, is distributed by Parker Hannifin Corporation. When disconnected, poppet valves in each half of the coupling are closed by respective valve springs, thereby stopping the flow of ammonia to the atmosphere. When the coupling is either fully connected or fully disconnected, a spring positions a sleeve to prevent locking balls from rising up out of their ball holes. When fully connected, the poppet valves in both coupling halves are open to allow ammonia flow. When the axial pull on the male coupling half exceeds the force of the sleeve spring, the coupling male half will pull out of the socket. The poppet valve then springs closed to stop the discharge of anhydrous ammonia from the flexible flow lines. The PIONEER coupler has been manufactured with stainless steel components which alleviated many of the problems it had with corrosion which led to failures in operation. There are, however, other characteristics inherent to this design.

The first and most significant problem with the PIONEER coupler is the flow restriction caused by the spring loaded poppets positioned in the flow stream. In anhydrous ammonia applications, the flow rate achievable through the breakaway coupler is of paramount importance. In situations where a farmer desires to put a certain amount of anhydrous ammonia per acre on a field, the time required to do the job is directly affected by the flow rate the application system can deliver. Anhydrous ammonia is typically not pumped to the application system but rather is driven solely by the fluid pressure of the anhydrous ammonia nurse (supply) tank. The pressure in the tank is a function of the ambient temperature, and when the temperature is relatively cool the tank pressure will be low. It is generally desirable to apply anhydrous ammonia when the ground is cool so as to improve absorption into the soil and minimize loss due to evaporation.

When the anhydrous ammonia meets a restriction in the application system, a pressure drop occurs, decreasing the maximum deliverable flow rate of the system. It is generally recognized that the breakaway coupler causes the most severe restriction in the system. When a farmer has several thousand acres to fertilize and there is a short time window where the soil temperature and moisture content is ideal for anhydrous application, it makes a big difference whether the application instrument can travel at, for example, 7 miles per hour and still achieve the desired application rate, or whether the speed must be reduced to, for example, 4 miles per hour because the system cannot deliver the flow required to run at 7 miles per hour. The difference can amount to additional days required to do the job. Because of these factors, a high flow breakaway coupler has always been desired.

A further problem with existing locking ball couplers is the difficulty of manually coupling or uncoupling them. This is routinely required for periodic safety inspection of the coupler or removal of the application hose for off-season storage. Existing devices require the user to muscle the coupler by hand to compress the main latch spring which typically requires from 200 to 300 pounds of force. The manual application of that level of force to a flexibly mounted coupler is at best difficult and at worst dangerous to do.

Other devices of interest are disclosed in U.S. Pat. Nos. 5,947,142, 5,699,822, 5,419,354, and 4,090,524. U.S. Pat. No. 5,947,142 discloses an improved breakaway coupling utilizing poppet-type valves. U.S. Pat. No. 5,699,822 discloses a breakaway coupling device using shear pins to couple male and female members and optionally including flapper-type valves. U.S. Pat. No. 5,419,354 discloses a frangible connector apparatus for controlling a fluid passage, providing at least one sliding gate movable transversely to the fluid passage. U.S. Pat. No. 4,090,524 discloses a valved fitting for handling flowing fluids having another valved fitting or conduit attached thereto wherein a frangible interconnection is utilized. Upon the frangible connection fracturing, such action is sensed by valve operating means for closing the valve against fluid flow producing a self-sealing fitting. A flapper valve is utilized to seal the valve passage with the goal of maximizing flow characteristics with a minimum of resistance during fluid flow.

SUMMARY OF THE INVENTION

A breakaway coupler is disclosed for coupling an upstream hose with a downstream hose to pass fluid therebetween when coupled and closing flow when uncoupled. An upstream housing is securable to the upstream hose. An upstream coupling member is secured to the upstream housing and has a flow passage for fluid communication with the upstream hose. A downstream housing is securable to the downstream hose. A downstream coupling member is secured to the downstream housing and has a flow passage for fluid communication with the downstream hose.

One or more locking balls or other locking members are preferably carried by the downstream coupling member. One or more receiving members or outwardly facing locking recesses are carried on the upstream coupling member. The one or more locking balls are movable radially inward into the one or more outwardly facing locking recesses to lock the upstream and downstream coupling members. A trigger member is positioned radially outward of the one or more locking balls and has one or more inwardly facing unlocking recesses. A trigger spring axially biases the downstream housing from the trigger member to position the locking member at least partially downstream from the one or more inwardly facing unlocking recesses to maintain locking of the upstream and downstream coupling members.

An upstream flapper is pivotally secured with respect to the upstream housing and is movable between an open and closed position to open and close flow through the upstream coupling member. The upstream flapper has a first engagement surface and a second engagement surface angled with respect to the first engagement surface. A pushrod is axially movable in response to engagement by the downstream coupling member. The pushrod has an end surface engageable with the first engagement surface for moving the upstream flapper to the open position and engageable with the second engagement surface to retain the upstream flapper in the open position. An outwardly facing pry recess is preferably included on the downstream coupling member, spaced between the downstream housing and the upstream housing, such that a tool inserted into the pry recess is leverageable to move the downstream coupling member to unlock the breakaway coupler.

This summary is intended to give a general description of one preferred embodiment of the invention, without limiting the invention. The foregoing aspects of the invention will be more fully understood and better appreciated by reference to the following description and drawings.

DETAILED DESCRIPTION OF THE PREFERRED EMBODIMENTS

Figure 1:
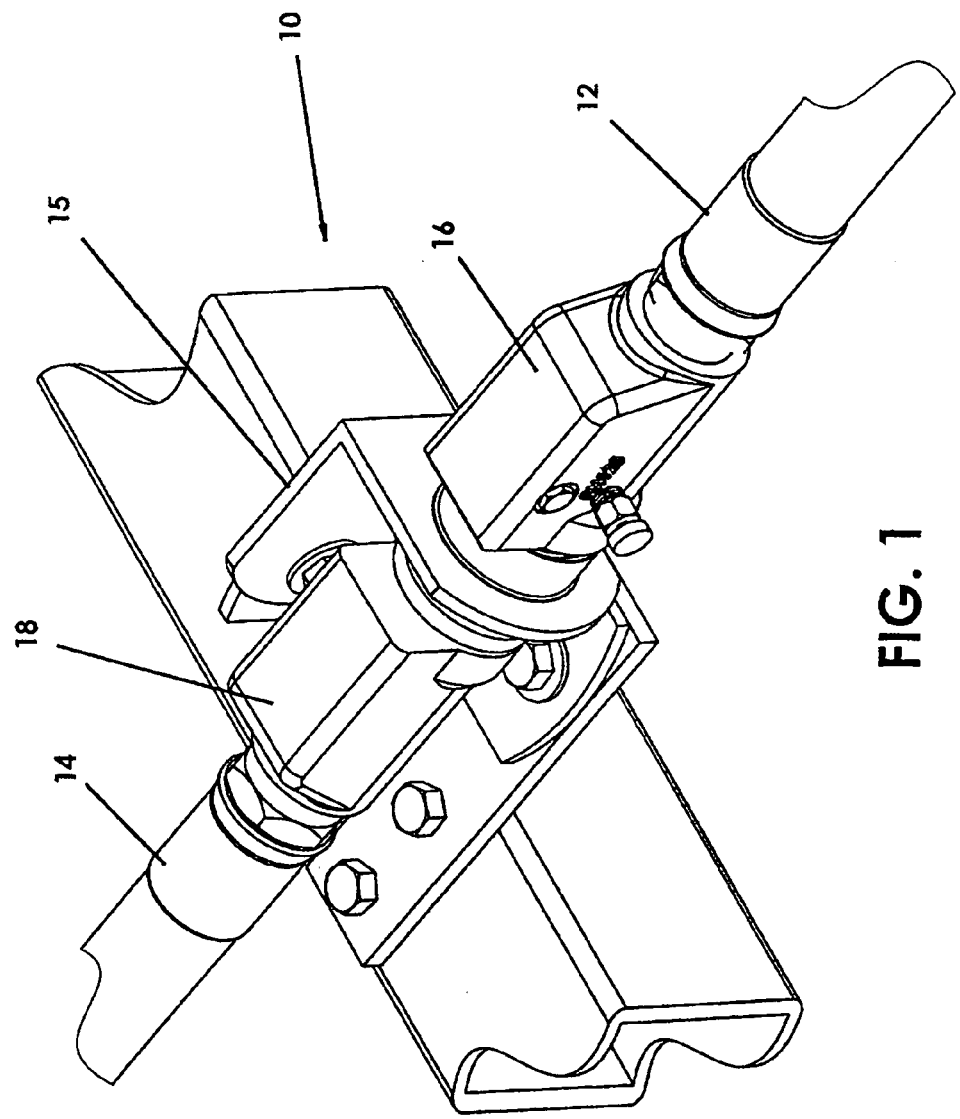
FIG. 1 shows a perspective view of the breakaway coupler with the downstream housing attached to a frame with a mounting bracket.

FIG. 1 shows a perspective view of a breakaway coupler 10 for coupling an upstream hose 12 with a downstream hose 14 for passing fluid therebetween when coupled and closing flow when uncoupled. An upstream housing 16 is secured to the upstream hose 12 and a downstream housing 18 is secured to the downstream hose 14. Bracket 15 may be used for mounting the breakaway coupler 10 to a suitable structural support. The upstream hose 12 typically supplies fluid from a portable nurse tank, and the downstream hose 14 may be connected to a fertilizer applicator on a moving farm vehicle.

Figure 2:
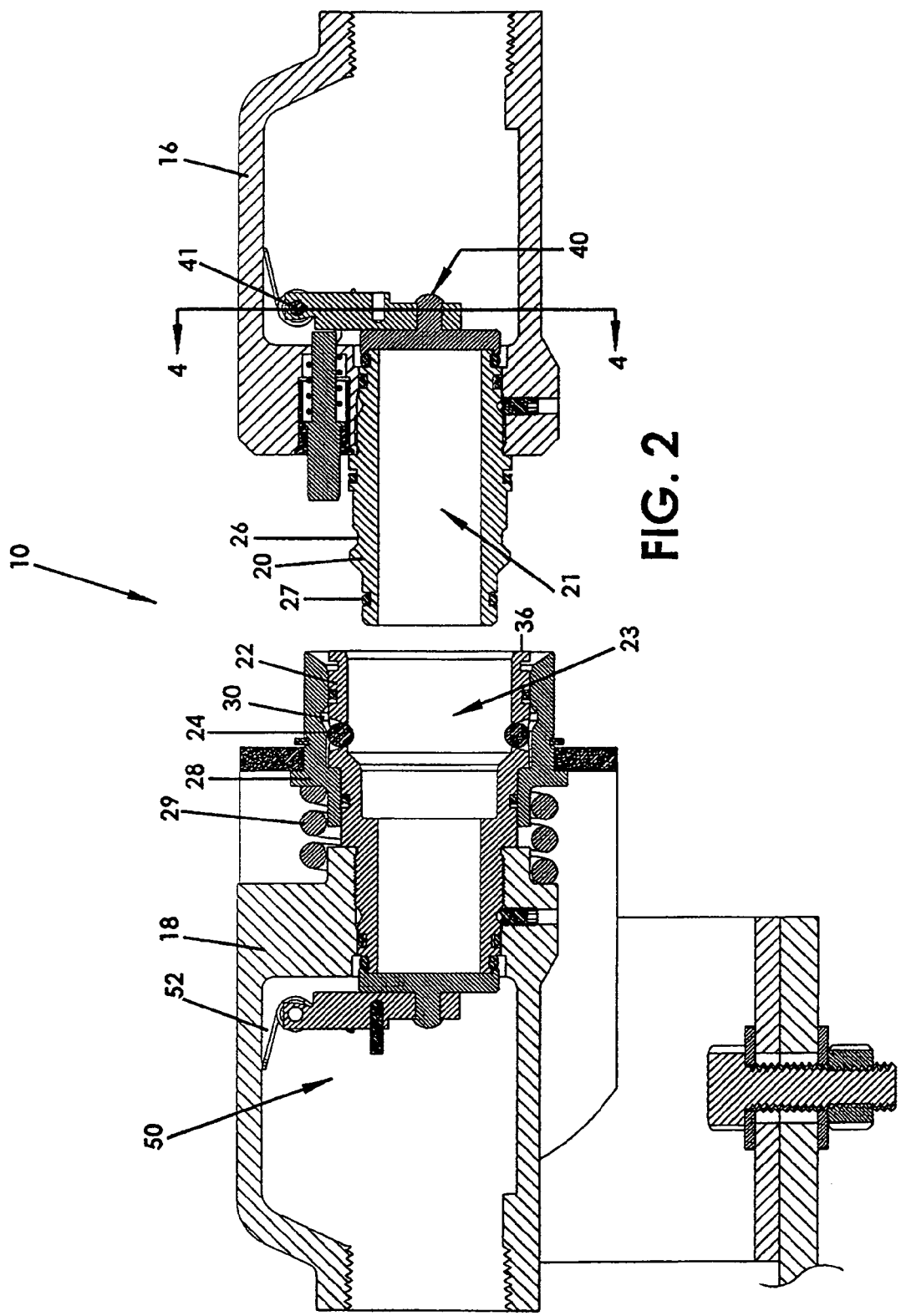
FIG. 2 shows the breakaway coupler wherein the upstream coupling member is unlocked and axially spaced from the downstream coupling member.

FIG. 2 shows a more detailed view of the breakaway coupler 10 when unlocked. An upstream coupling member 20 is secured to the upstream housing 16 and has a flow passage 21 for fluid communication with the upstream hose (not shown). A downstream coupling member 22 is threadedly secured to the downstream housing 18 and has a flow passage 23 for fluid communication with the downstream hose (not shown). A locking member 24 is carried by the downstream coupling member 22 for selectively locking with the upstream coupling member 20. As shown, a preferred embodiment of the locking member 24 is a plurality of locking balls 24, although other locking members may be used, as discussed below. A receiving member 26, which is preferably the one or more outwardly facing locking recesses 26 shown, is defined by the upstream coupling member 20. The one or more locking balls 24 are radially movable into and out of the one or more locking recesses 26 to respectively lock and unlock the upstream and downstream coupling members 20, 22.

Figure 3:
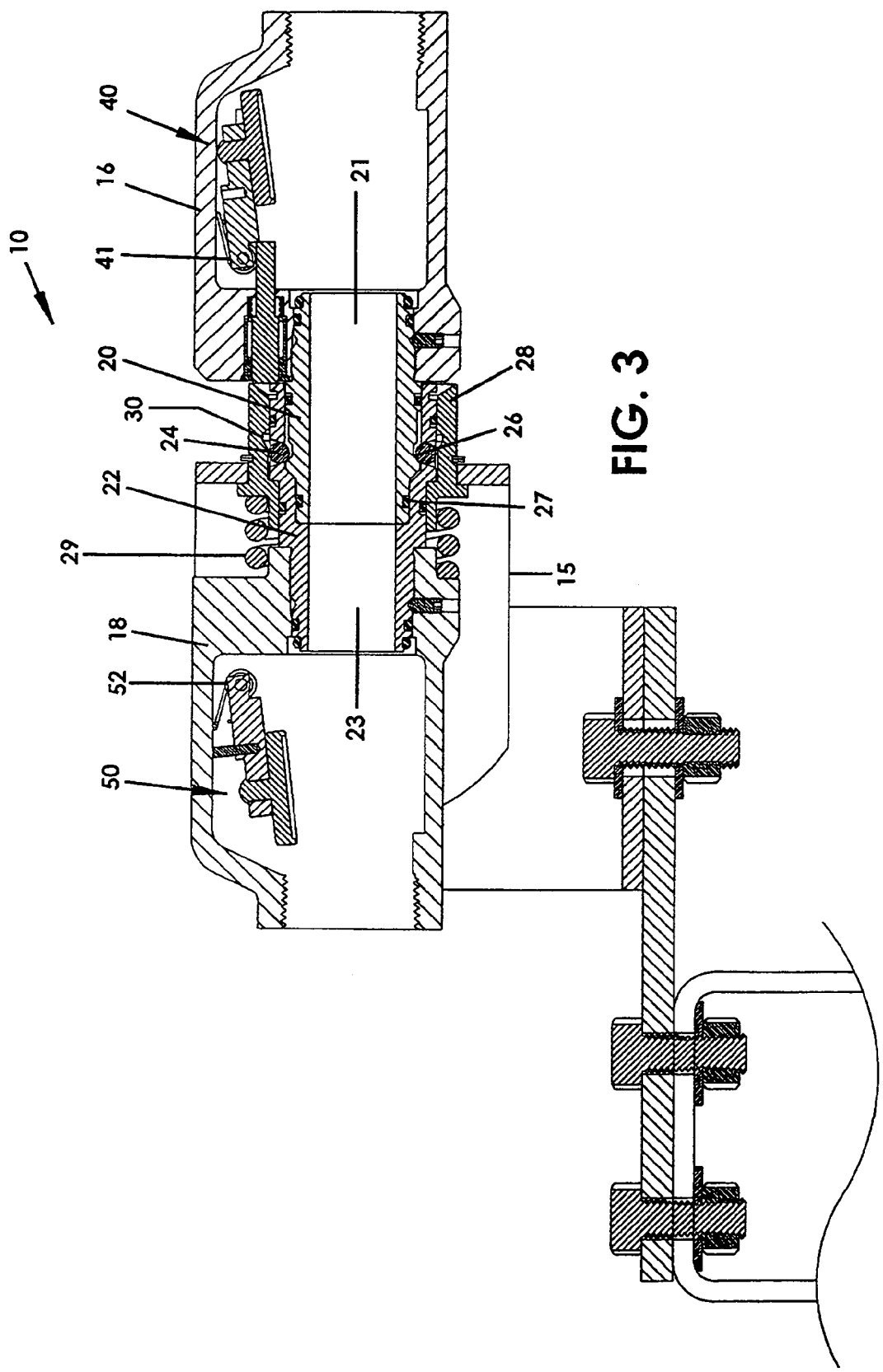
FIG. 3 shows the breakaway coupler wherein the upstream coupling member is locked to the downstream coupling member.
Figure 4:
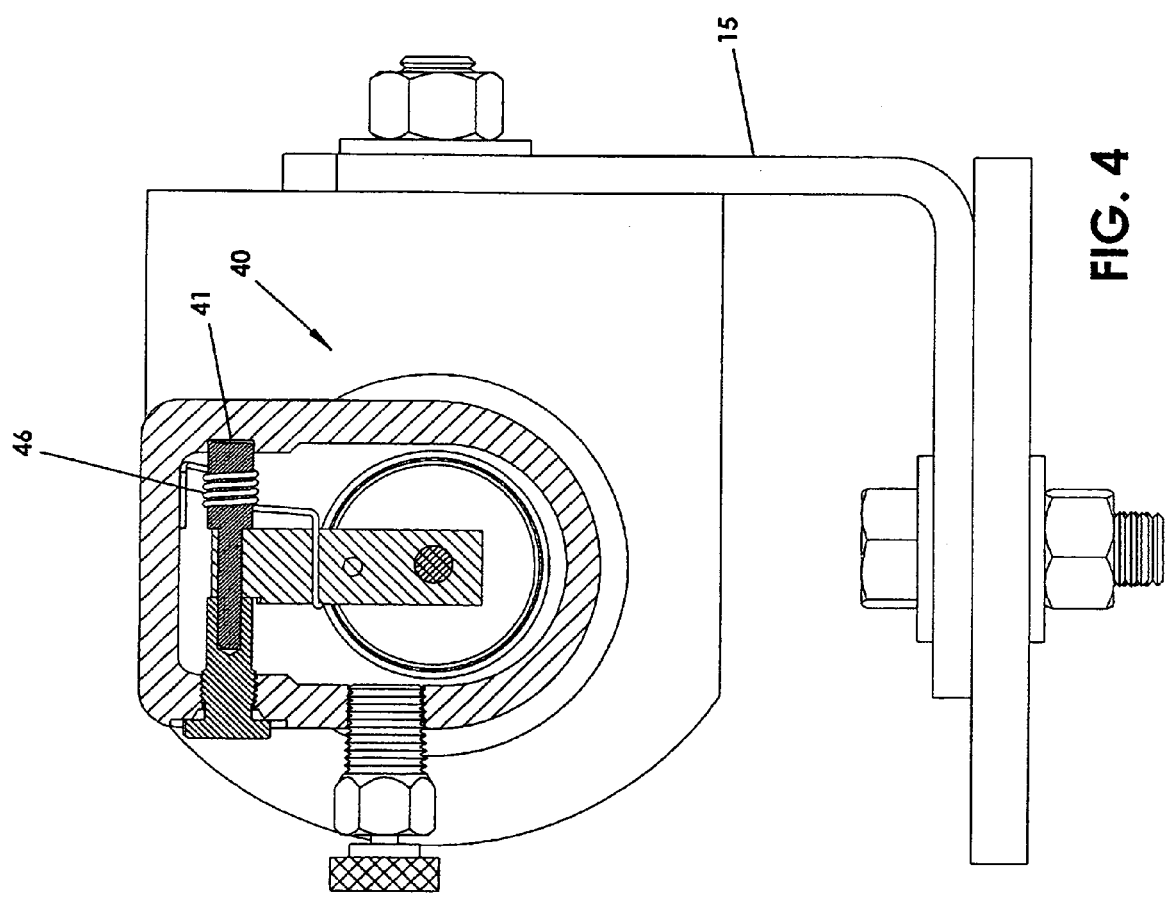
FIG. 4 shows a sectional view 4—4 from FIG. 2.

FIG. 3 shows the breakaway coupler 10 when locked, with the locking balls 24 radially moved into the locking recesses 26 to lock the upstream and downstream coupling members 20, 22. Seals such as o-ring 27 are provided to seal between the coupling members 20, 22, so that fluid may be reliably passed from the upstream hose 12 to the downstream hose 14. A trigger member 28 is secured to the bracket 15 and is positioned radially outward of the locking balls 24. The trigger member 28 has one or more inwardly facing unlocking recesses 30 into which the locking balls 24 are movable when the locking balls 24 are substantially axially aligned with the unlocking recesses 30. As shown, however, a trigger spring 29 axially biases the downstream housing 18 from the trigger member 28 to position the locking balls 24 at least partially downstream from the one or more inwardly facing unlocking recesses 30 to maintain locking of the upstream and downstream coupling members 20, 22.

Figure 6:
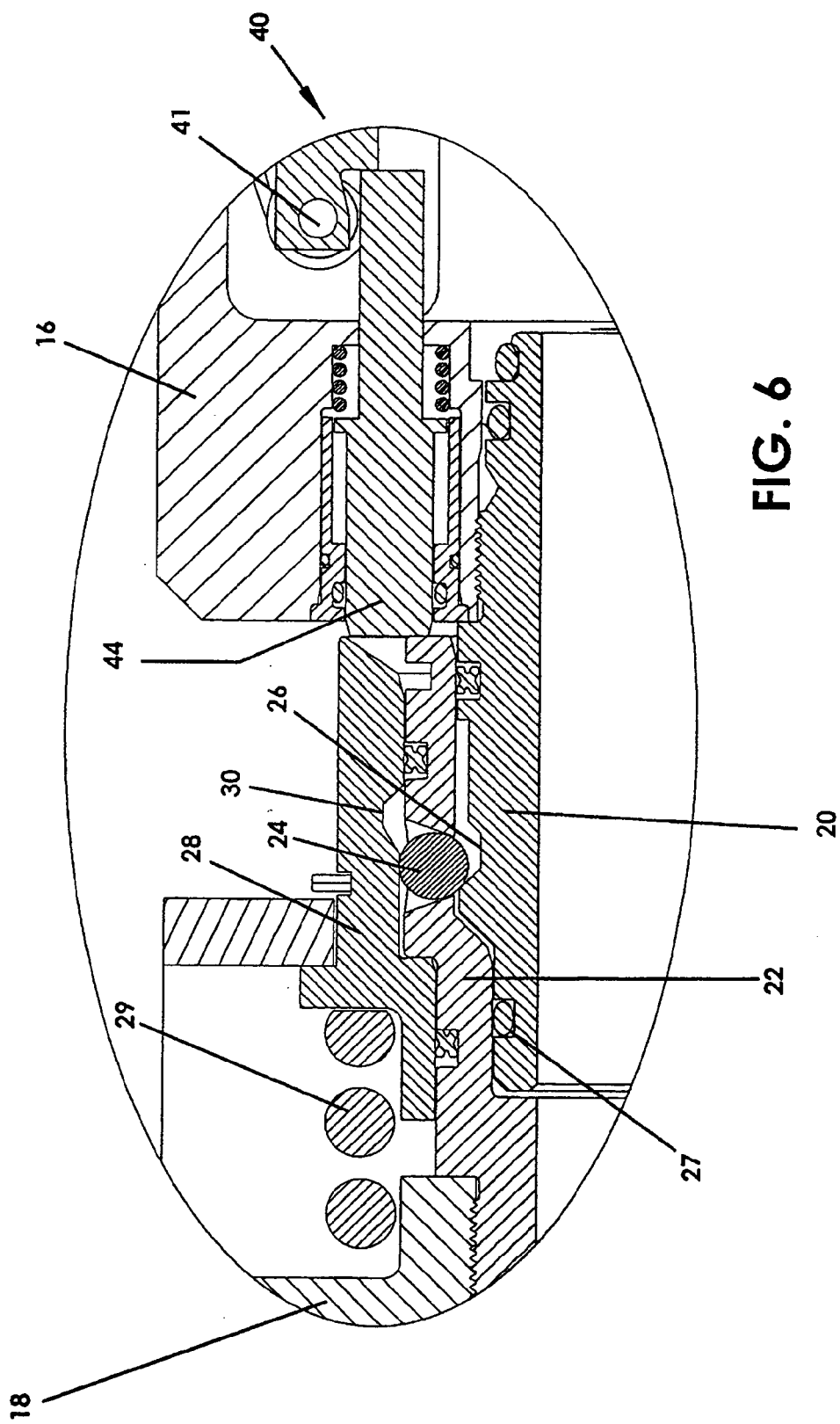
FIG. 6 shows an enlarged view with the flapper in the open position, with the pushrod moved axially into engagement with the second engagement surface to retain the flapper in the open position.
Figure 7:
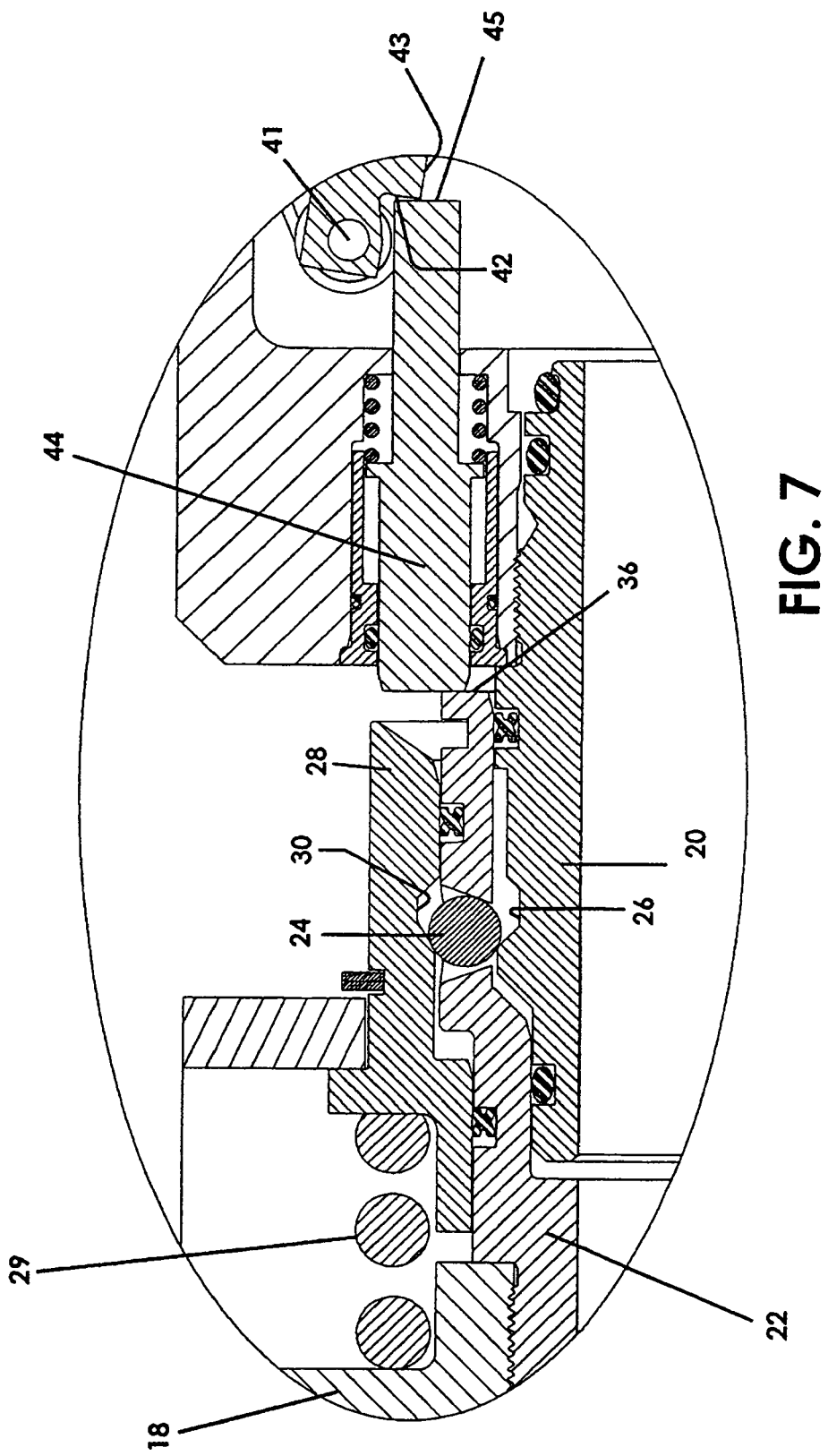
FIG. 7 shows an enlarged view with the locking ball movable into the inwardly facing unlocking recess to unlock the upstream and downstream coupling members.

FIGS. 6 and 7 show some of the above features in closer detail. In FIG. 6, the coupler 10 is locked, as in FIG. 3. The locking ball 24 is sufficiently downstream from the unlocking recess 30 that it cannot be radially moved into the unlocking recess 30. Rather, the locking ball is maintained at least partially within the outwardly facing locking recess 26, such that the upstream coupling member 20 cannot slide past the locking ball 24, and is effectively locked to the downstream coupling member 22 on which the locking ball 24 is carried.

In FIG. 7, the coupler 10 is on the verge of unlocking. A pulling force transmitted through hose 12 and housing 16 is transferred to the male coupling member 20, then to the female coupling member 22 and the downstream housing 18. The downstream housing 18 is thus forcibly urged slightly upstream against the resistance of the trigger spring 29. Since the downstream housing 18 carries with it the downstream coupling member 22, the locking ball 24 are moved closer to the unlocking recess 30. The locking ball 24 is now close enough to the unlocking recess 30 that it is free to begin moving radially into the unlocking recess 30 and out of the locking recess 26, so that the upstream coupling member 20 can slide past the locking ball 24 to unlock the coupler 10. The upwardly sloping ends of locking recess 26 desirably urge the locking ball 24 radially outwardly out of the recess 26.

Figure 8:
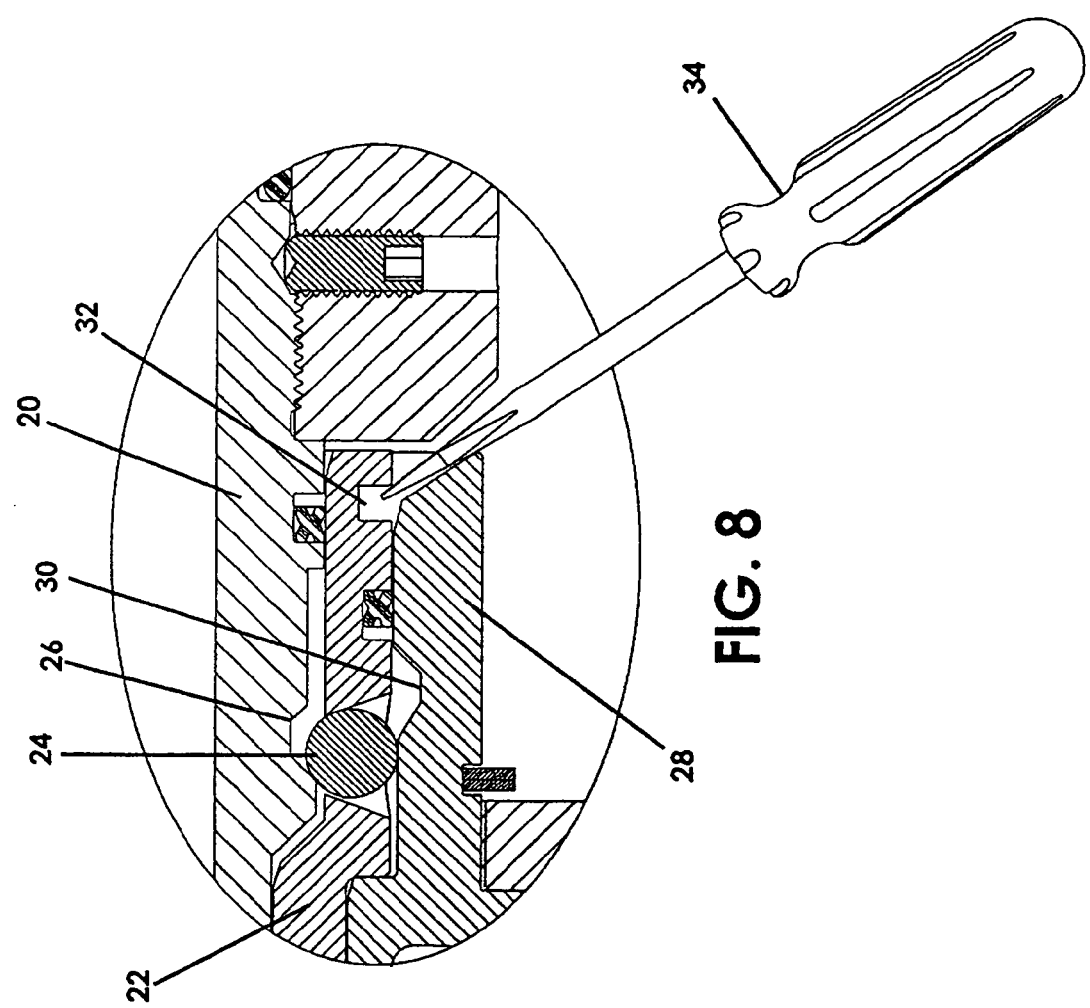
FIG. 8 shows a screwdriver inserted into the pry recess prior to leveraging against the trigger member.
Figure 9:
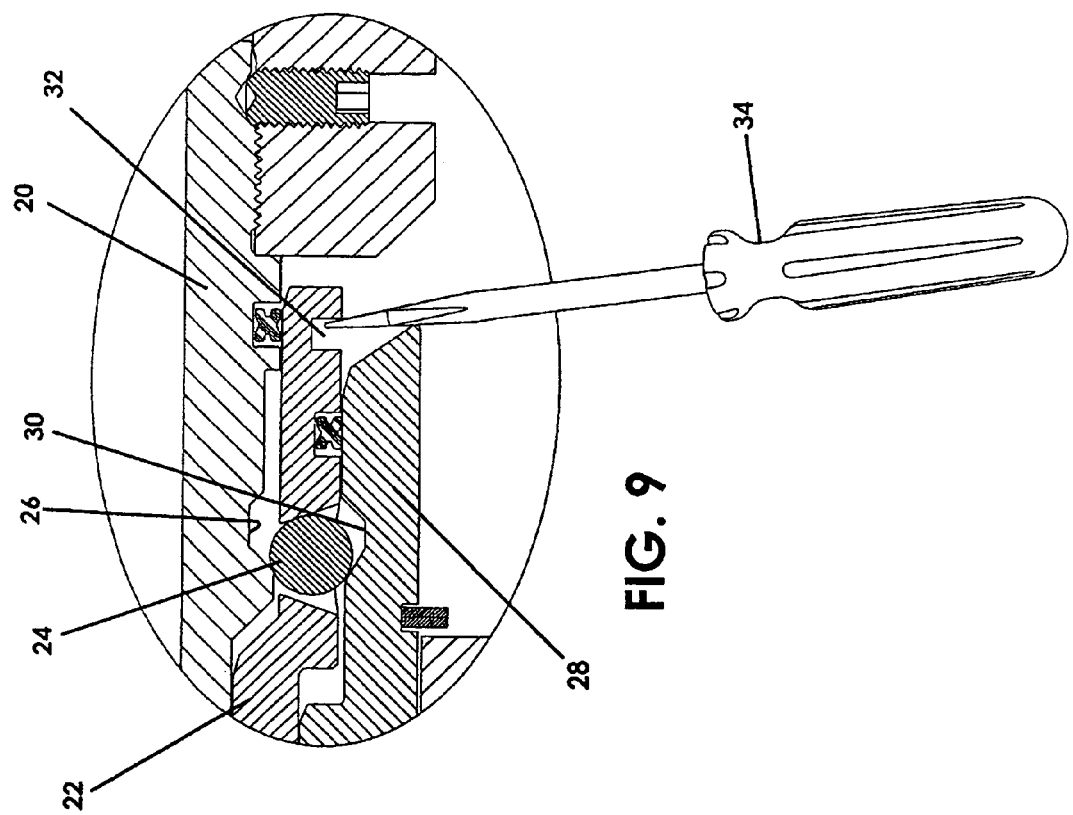
FIG. 9 shows a screwdriver inserted into the pry recess and leveraged against the trigger member to align the locking ball with the unlocking recess to unlock the upstream and downstream coupling members.

Although the spring 29 ensures a reliable locking connection, considerable force is typically required to move the housing 18 as described above, which can be difficult to apply by hand. To alleviate this problem, the invention provides an outwardly facing pry recess 32 detailed in FIGS. 8 and 9. The pry recess 32 is spaced between the downstream housing 18 and the upstream housing 16, and is closely adjacent an end of the trigger member 28 when the coupling is mated. A screwdriver 34 or other tool inserted into the pry recess is leverageable against the trigger member 28 to move the downstream coupling member 22 with respect to the trigger member 28. During this movement shown between FIGS. 8 and 9, the locking ball 24 carries with it the downstream coupling member 22 and the downstream housing 18 to which coupling member 22 is secured. The trigger spring 29 provides resistance to this motion to resist unlocking of the coupler 10. In FIG. 9, the locking ball 24 is close enough to the unlocking recess 30 that it is free to begin moving radially into the unlocking recess 30 and radially out of the locking recess 26, so that the upstream coupling member 20 can slide past the locking ball 24 to unlock the coupler 10. This unlocking motion is conceptually the same as that described above, except that at least some of the force is provided by leveraging the screwdriver 34 to reduce or eliminate the degree of force required by hand. A similar operation may be used to overcome the spring 29 and mate the coupling to a locking position. The leverage provided by the screwdriver 34 thus makes it easier to lock or unlock the coupler 10.

Figure 5:
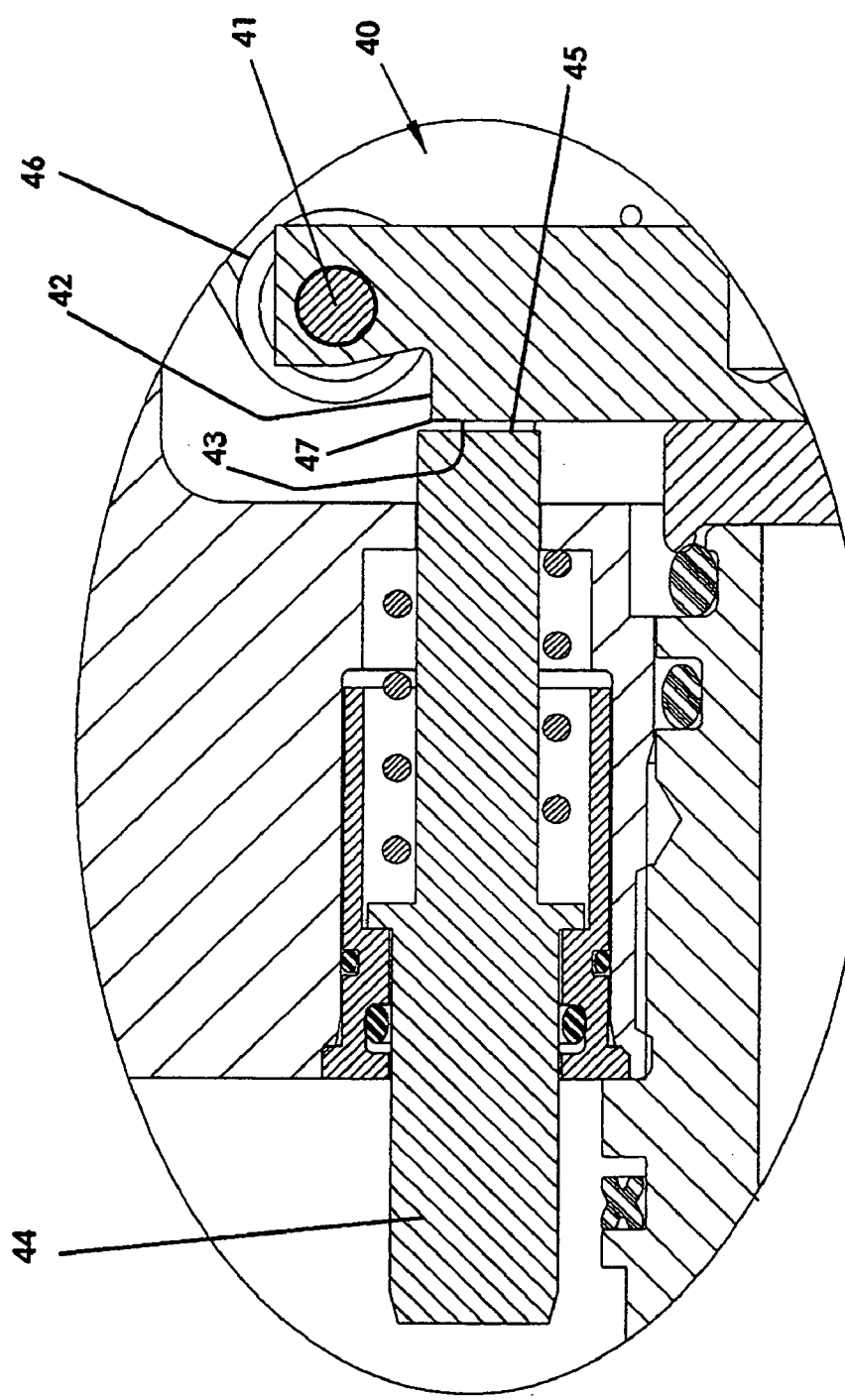
FIG. 5 shows an enlarged view wherein the flapper is closed and the pushrod is axially movable to engage the first engagement surface to open the flapper.

Referring back to FIGS. 2 and 3, the breakaway coupler 10 opens flow when locked and closes fluid flow when unlocked. This is a safety precaution for instances where the upstream hose 12 is inadvertently pulled away, such as if the driver of a tank truck drives away before disconnecting the upstream hose 12. This would create the unlocking motion described above by forcefully pulling on the upstream coupling member, which in turn pulls the downstream coupling member toward the trigger member to separate the coupling. An upstream flapper 40 is pivotally secured at hinge 41 with respect to the upstream housing 16, and is movable between the closed position of FIG. 2 and the open position of FIG. 3 to open and close flow through the upstream coupling member 20. As shown more closely in FIGS. 5–7, the upstream flapper 40 has a first engagement surface 42 and a second engagement surface 43 angled with respect to the first engagement surface 42, preferably at a 90-degree angle. The first and second engagement surfaces 42, 43 are radially spaced from a flapper axis of rotation at hinge 41. A pushrod 44 sealed to upstream housing 16 is axially movable with respect to the upstream housing 16 in response to axial movement of the coupling members. Specifically, as shown, an end 36 of the downstream coupling member 22 preferably engages the pushrod 44 when the upstream and downstream coupling members 20, 22 are moved together when locking. The pushrod 44 has an end surface 45 engageable with the first engagement surface 43 for moving the upstream flapper 40 to the open position. With first engagement surface 43 so engaged, the flapper 40 is pivoted toward the open position. With the flapper 40 so moved, the end surface 45 of the pushrod 44 is then engageable with the second engagement surface 42 to retain the upstream flapper 40 in the open position. Thus, locking the upstream and downstream coupling members 20, 22 opens the upstream flapper 40 and unlocking the upstream and downstream coupling members 20, 22 allows the upstream flapper 40 to close. The flapper 40 is biased to the closed position with flapper biasing spring 46.

To facilitate rotation of the flapper 40 in response to axial movement of the pushrod 44, the first and second engagement surfaces preferably intersect at an edge 47. The edge 47 may be a "knife-edge" or a slightly rounded edge, so long as the end surface 45 of pushrod 44 is allowed to transition from first engagement surface 43 to second engagement surface 42 between locking and unlocking. Furthermore, the first and second engagement surfaces 43, 42 are preferably at 90 degrees from each other, which may correspond to a preferred approximately 90-degree travel of the flapper 40 between open and closed positions.

It is desirable to minimize movement of the flapper 40 prior to fully unlocking the upstream and downstream coupling members 20, 22. If the flapper 40 were to enter a forceful flow stream before the coupling members 20, 22 were fully unlocked, the flapper 40 could get damaged from the resulting forces. It is therefore important to minimize the amount of axial displacement between the coupling members 20, 22 prior to unlocking, thereby minimizing the amount of travel of the pushrod 44 and the corresponding amount of rotation of the flapper 40. Accordingly, the trigger spring 29 preferably biases the downstream housing 18 and thus the downstream coupling member 22 to position the one or more locking balls 24 no more than one ball diameter downstream from the inwardly facing unlocking recesses 30. This limits travel of the pushrod 44 when unlocking. The pushrod 44 is preferably spring-biased for axially biasing the pushrod 44 away from the second engagement surface to allow the upstream flapper 40 to close. The upstream flapper 40 may alternatively push the pushrod 44 out of the way as it closes. The pushrod 44 is fluidly sealed to upstream housing 16, as shown.

Although upstream hose 12 is typically a supply hose and downstream hose 14 is typically a hose for receiving and transporting fluids to a tank, and it is also desirable to close off flow from the downstream hose 14. A downstream flapper 50 may be pivotally secured with respect to the downstream housing 18 and movable between an open and closed position to open and close flow through the downstream coupling member 22. As shown in FIG. 2, the downstream flapper 50 may pivot in such a way that fluid flowing from the upstream hose 12 urges the downstream flapper 50 open. The downstream flapper 50 may be biased to a closed position with another flapper spring 52.

Although the locking members are preferably locking balls 24, they may take other shapes and forms, such as one or more radially movable locking pins or collet members. The receiving members, although preferably recesses as discussed, may also take other shapes and forms, such as through-holes or flanges.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

What is claimed is:

1. A breakaway coupler for coupling an upstream hose with a downstream hose for passing fluid therebetween when coupled and closing flow when uncoupled, the breakaway coupler comprising:
    an upstream housing securable to the upstream hose;
    an upstream coupling member secured to the upstream housing and having a flow passage for fluid communication with the upstream hose;
    a downstream housing securable to the downstream hose;
    a downstream coupling member secured to the downstream housing and having a flow passage for fluid communication with the downstream hose;
    a locking member carried by one of the upstream and downstream coupling members and a receiving member defined by the other of the upstream and downstream coupling members, the locking member radially movable into and out of the receiving member to respectively lock and unlock the upstream and downstream coupling members;
    a trigger member radially outward of the locking member and having one or more inwardly facing unlocking recesses into which the locking member is movable to unlock the upstream and downstream coupling members;
    a trigger spring axially biasing the one of the upstream and downstream coupling members on which the locking member is carried; and
    an outwardly facing pry recess on the one of the upstream and downstream coupling members on which the locking member is carried, such that a tool inserted into the pry recess is leverageable to move the locking member toward the one or more unlocking recesses.

2. A breakaway coupler as defined in claim 1, further comprising:
    the locking member being carried by the downstream coupling member and the receiving member being carried by the upstream coupling member, the locking member movable radially into the receiving member to lock the upstream and downstream coupling members.

3. A breakaway coupler as defined in claim 2, further comprising:
    the locking member including one or more locking balls and the receiving member including one or more outwardly facing locking recesses.

4. A breakaway coupler as defined in claim 3, wherein the trigger spring axially biases the locking member to position the one or more locking balls no more than one ball diameter away from the inwardly facing unlocking recesses.

5. A breakaway coupler as defined in claim 1, further comprising:
    an upstream flapper pivotally secured with respect to the upstream housing and movable between an open and closed position to open and close flow through the upstream coupling member, the upstream flapper having a first engagement surface and a second engagement surface angled with respect to the first engagement surface, the first and second engagement surfaces radially spaced from a flapper axis of rotation; and
    a pushrod axially movable with respect to the upstream housing in response to axial movement of the coupling members, the pushrod having an end surface engageable with the first engagement surface for moving the upstream flapper to the open position and engageable with the second engagement surface to retain the upstream flapper in the open position, such that locking the upstream and downstream coupling members opens the upstream flapper and unlocking the upstream and downstream coupling members allows the upstream flapper to close.

6. A breakaway coupler as defined in claim 5, further comprising:
    a receiving member defined by the other of the upstream and downstream coupling members, the locking member radially movable into and out of the receiving member to respectively lock and unlock the upstream and downstream coupling members.

7. A breakaway coupler as defined in claim 6, further comprising:
    the locking member being carried by the downstream coupling member and the receiving member being carried by the upstream coupling member, the locking member movable radially into the receiving member to lock the upstream and downstream coupling members.

8. A breakaway coupler as defined in claim 5, further comprising:
    the downstream coupling member engaging the pushrod to move the upstream flapper to the open position.

9. A breakaway coupler as defined in claim 5, further comprising:
    a flapper biasing spring for biasing the upstream flapper toward the closed position.

10. A breakaway coupler as defined in claim 5, further comprising:
    a downstream flapper pivotally secured with respect to the downstream housing and movable between an open and closed position to open and close flow through the downstream coupling member.

11. A breakaway coupler as defined in claim 5, wherein the second engagement surface is angled at approximately 90 degrees to the first engagement surface.

12. A breakaway coupler for coupling an upstream hose with a downstream hose for passing fluid therebetween when coupled and closing flow when uncoupled, the breakaway coupler comprising:
    an upstream housing securable to the upstream hose;
    an upstream coupling member secured to the upstream housing and having a flow passage for fluid communication with the upstream hose;
    a downstream housing securable to the downstream hose;
    a downstream coupling member secured to the downstream housing and having a flow passage for fluid communication with the downstream hose;

a locking member carried by one of the upstream and downstream coupling members and a receiving member defined by the other of the upstream and downstream coupling members, the locking member radially movable into and out of the receiving member to respectively lock and unlock the upstream and downstream coupling members;

a trigger member having one or more inwardly facing unlocking recesses into which the locking member is movable to unlock the upstream and downstream coupling members;

a trigger spring axially biasing the one of the upstream and downstream coupling members on which the locking member is carried; and an outwardly facing pry recess, such that a tool inserted into the pry recess is leverageable to move the locking member toward the one or more unlocking recesses.

13. A breakaway coupler as defined in claim 12, further comprising:

the locking member being carried by the downstream coupling member and the receiving member being carried by the upstream coupling member, the locking member movable radially into the receiving member to lock the upstream and downstream coupling members.

14. A breakaway coupler as defined in claim 12, further comprising:

the locking member including one or more locking balls and the receiving member including one or more outwardly facing locking recesses.

15. A breakaway coupler as defined in claim 12, wherein the trigger spring axially biases the locking member to position the one or more locking balls no more than one ball diameter away from the inwardly facing unlocking recesses.

16. A breakaway coupler as defined in claim 12, further comprising:

an upstream flapper pivotally secured with respect to the upstream housing and movable between an open and closed position to open and close flow through the upstream coupling member, the upstream flapper having a first engagement surface and a second engagement surface angled with respect to the first engagement surface, the first and second engagement surfaces radially spaced from a flapper axis of rotation; and a pushrod axially movable with respect to the upstream housing in response to axial movement of the coupling members, the pushrod having an end surface engageable with the first engagement surface for moving the upstream flapper to the open position and engageable with the second engagement surface to retain the upstream flapper in the open position, such that locking the upstream and downstream coupling members opens the upstream flapper and unlocking the upstream and downstream coupling members allows the upstream flapper to close.

17. A breakaway coupler as defined in claim 16, further comprising:

a receiving member defined by the other of the upstream and downstream coupling members, the locking member radially movable into and out of the receiving member to respectively lock and unlock the upstream and downstream coupling members.

18. A breakaway coupler as defined in claim 16, further comprising:

a downstream flapper pivotally secured with respect to the downstream housing and movable between an open and closed position to open and close flow through the downstream coupling member.

19. A method of decoupling a breakaway coupler, the method comprising:

securing an upstream housing to the upstream hose;

securing an upstream coupling member to the upstream housing and having a flow passage for fluid communication with the upstream hose;

securing a downstream housing to the downstream hose;

securing a downstream coupling member to the downstream housing and having a flow passage for fluid communication with the downstream hose;

carrying a locking member on one of the upstream and downstream coupling members and a receiving member on the other of the upstream and downstream coupling members, the locking member radially movable into and out of the receiving member to respectively lock and unlock the upstream and downstream coupling members;

providing a trigger member having one or more inwardly facing unlocking recesses into which the locking member is movable to unlock the upstream and downstream coupling members;

axially biasing the one of the upstream and downstream coupling members on which the locking member is carried;

providing an outwardly facing pry recess on the one of the upstream and downstream coupling members on which the locking member is carried; and inserting a tool into the pry recess to move the locking member toward the one or more unlocking recesses.

20. A method as defined in claim 16, further comprising:

the locking member including one or more locking balls and the receiving member including one or more outwardly facing locking recesses; and axially biasing the locking member to position the one or more locking balls no more than one ball diameter away from the inwardly facing unlocking recesses.

* * * * *